Sept. 25, 1923.

E. N. MALVERN

CHAIN CONNECTOR

Filed Oct. 9, 1922

1,469,164

WITNESSES

INVENTOR
Edmund N. Malvern
BY
ATTORNEYS

Patented Sept. 25, 1923.

1,469,164

UNITED STATES PATENT OFFICE.

EDMUND N. MALVERN, OF BURLINGTON JUNCTION, MISSOURI.

CHAIN CONNECTOR.

Application filed October 9, 1922. Serial No. 593,299.

*To all whom it may concern:*

Be it known that I, EDMUND N. MALVERN, a citizen of the United States, and a resident of Burlington Junction, in the county of Nodaway and State of Missouri, have invented certain new and useful Improvements in a Chain Connector, of which the following is a full, clear, and exact description.

This invention relates to improvements in fastening attachments or connectors for chain ends, such as the opposite ends of a tire chain.

An object of the invention is to provide such a connector, of a new and improved design as to cost of manufacture, ease of attachment and detachment, and reliability in appointed functions; an important feature of the new connector, in connection with the advantages foregoing, being its construction of a single length of bent wire.

Heretofore many attempts have been made to provide such connectors but the same have usually had the disadvantage of being difficult to manufacture and apply, and when applied have not been reliable as to the making of a secure and tight hold not affected by end pulls on the connector, as the result of interposing the hook and eye or equivalent features of the connectors between adjacent links in such a way as to subject these parts to a tendency to disengagement due to the strains imparted to the chain links tending to pull them further apart. Where the just-mentioned disadvantages have been to some extent provided against, the connector has included a plurality of lengths of wire, and sometimes such a plurality plus additional parts, as pivot studs, washers, auxiliary springs, etc.; or else, and sometimes even in a multi-part structure as just indicated, the connectors heretofore proposed have required special tools to be used in connection with the same, or have been of such a design that their wire lengths, and particularly terminal wire lengths, have projected in various dangerous directions, and the bulk of the connector has been considerable compared to the simple function always in mind in providing such a connector.

The most important object of the present invention is to provide a connector of the kind indicated, constructed of a single length of bent wire, and adapted to overcome all the disadvantages just noted.

The invention will be more clearly understood from the following description, when taken in connection with the accompanying drawing, showing illustratively, and as one example of a possible construction by which the invention may be carried out, an embodiment thereof as at present preferred.

Figure 1:
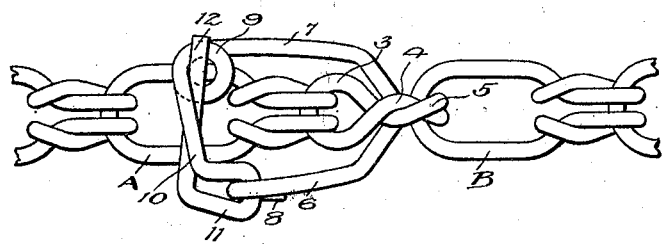
Figure 2:
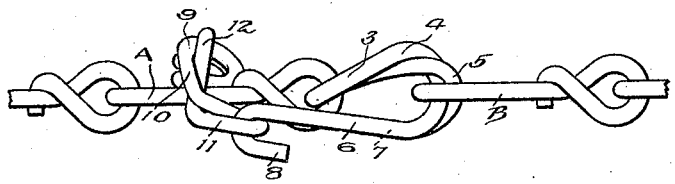

In this drawing:

Fig. 1 is a plan view of such embodiment, associated with chain links to be joined; and Fig. 2 is a side elevation of the parts shown in Fig. 1.

Similar reference characters refer to similar parts throughout both views.

The links A and B are the terminal links of different chains to be connected, or, as the invention will probably be employed, the links at the opposite ends of a single chain in cases where such opposite end links are to be joined, as in the case of a tire chain.

The new device comprises a single piece of bent wire, preferably of rather stiff steel wire, having an intermediate portion bent into a loop 3, to connect one link A of the chain to be joined. Beyond such loop, the two lengths of the wire, after being preferably twisted together as indicated at 4, are both reversely bent to form a second, and what may be termed a "two-strand" loop 5 in a plane substantially perpendicular to the plane of the first loop, this second loop engaging the link B. Portions of the piece of wire are thereafter continued as substantially parallel arms or stretches 6 and 7. The arm 6 is the shorter and is provided with a terminal hook 8 lying in substantially the same plane as the second loop 5. The longer arm 7, after being given a single coil as indicated at 9, such coil lying in the same plane as the first loop 3, is continued substantially at right angles to the arm 7, as a transverse arm 10. Arm 10, after being given a series of bends in a plane parallel to the plane of the first loop 3, to form a substantially rectangular eye or keeper 11 for the hook 8, is continued as a terminal length 12 running back substantially in close intimacy with arm 10 and between the same and link A. This terminal arm 12 has its other end resiliently interlocked with the coil 9.

According to this construction, it will be noted that while the connector is made of a single piece of bent wire as explained, the coil 9 acts as one of the resilient parts functioning to hold the hook and eye in secure and tight engagement, and yet in a manner readily detachable or attachable whenever desired without special tools of any kind; and at the same time the length 12, while also forming one of said resilient parts coacting with coil 9, acts further, and in combination with said coil, to absolutely prevent accidental opening of the eye sufficiently to release the hook, no matter what the pull be between links A and B, thus avoiding any possibility of such a pull ever having a tendency to urge the hook to become disengaged from the eye. It will be seen further that the new connector, while it may be permanently connected with one link A of a chain, in which case after the loop 3 is engaged with said link A the twist 4 will be preferably established, nevertheless the hook and eye portions of the connector are not interposed between the two links A and B, and therefore, as explained in the preceding sentence, are not subjected to disengaging strain as the result of forces applied to the two links tending to pull them apart; and yet, the thickness of the chain and its connecting fixture, at the location of the hook and eye, or elsewhere, is not materially thickened.

To separate the links A and B, it is only necessary to press on the end of the eye 11 most removed from the hook 8, disengage the hook, turn the link B so that its length is perpendicular to the arms 6 and 7, move relatively the connector and link B as thus disposed until the link passes beyond the hook 8, and then, tilting the link slightly, move relatively the link and the cross-structure of the connector arranged between the loop 9 and the eye 11, until the link passes beyond the eye. In order to join the links A and B, these operations are merely performed in the reverse order.

It will thus be seen that I have provided an embodiment of the invention well calculated to obtain all the objects and advantages hereinbefore mentioned.

Various slight changes might be made in the general form and arrangement of the parts described without departing from the invention, and hence I do not limit myself to the precise details set forth, but consider myself at liberty to make such changes and alterations as fairly fall within the spirit and scope of the appended claims.

I claim:

1. A connector for a pair of chain links comprising a unitary piece of bent wire, and including an intermediate length bent into a loop for one of said links, the lengths of said wire beyond said loop being bent into a second loop arranged in a plane substantially perpendicular to the plane of the first loop and being thence continued toward the first loop and then respectively formed into a hook and a resiliently engaging keeper for such hook, the lengths of the wire beyond the second loop, when said hook is engaged with its keeper, defining a third loop, said first and third loops being overlappingly arranged in substantially parallel planes, one of which last-mentioned loops is smaller than the other.

2. A connector for a pair of chain links comprising a unitary piece of bent wire, and including an intermediate length bent into a loop for one of said links, the lengths of said wire beyond said loop being bent into a second loop arranged in a plane substantially perpendicular to the plane of the first loop and being thence continued toward the first loop and then respectively formed into a hook and a resiliently engaging keeper for such hook, the lengths of the wire beyond the second loop, when said hook is engaged with its keeper, defining a third loop, said first and third loops being overlappingly arranged in substantially parallel planes, the first loop being smaller than the third loop.

3. A connector for a pair of chain links comprising a unitary piece of bent wire, and including an intermediate length bent into a loop for one of said links, the lengths of said wire beyond said loop being bent into a second loop arranged in a plane substantially perpendicular to the plane of the first loop and then respectively formed into a hook and a resiliently engaging keeper for such hook, said keeper comprising an eye located intermediate the ends of the length which forms said eye, the last-mentioned length having a terminal portion reversely bent on another portion of said length, said last-mentioned portion crossing the chain laterally away from the point of formation of said eye.

4. A connector for a pair of chain links comprising a unitary piece of bent wire, and including an intermediate length bent into a loop for one of said links, the lengths of said wire beyond said loop being bent into a second loop arranged in a plane substantially perpendicular to the plane of the first loop and then respectively formed into a hook and a resiliently engaging keeper for such hook, said keeper comprising an eye located intermediate the ends of the length which forms said eye, the last-mentioned length having a terminal portion reversely bent on another portion of said length, said last-mentioned portion crossing the chain laterally away from the point of formation of said eye, said last-mentioned length having a coil formed therein at the junction of said last-mentioned portion and a portion extending between the second loop and said coil, and the free end of said terminal portion and said coil being resiliently interlocked.

EDMUND N. MALVERN.